US007926259B2

(12) United States Patent
Orlando et al.

(10) Patent No.: US 7,926,259 B2
(45) Date of Patent: Apr. 19, 2011

(54) TURBOFAN ENGINE ASSEMBLY AND METHOD OF ASSEMBLING SAME

(75) Inventors: Robert Joseph Orlando, West Chester, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 845 days.

(21) Appl. No.: 11/554,993

(22) Filed: Oct. 31, 2006

(65) Prior Publication Data

US 2008/0098714 A1   May 1, 2008

(51) Int. Cl.
*F02K 3/02* (2006.01)
*F02K 3/072* (2006.01)

(52) U.S. Cl. ......... 60/204; 60/226.1; 60/268; 60/39.162
(58) Field of Classification Search ............... 60/226.1, 60/268, 39.162, 204
See application file for complete search history.

(56) References Cited

U.S. PATENT DOCUMENTS

| | | | |
|---|---|---|---|
| 3,620,021 A * | 11/1971 | Lawrie | 60/226.1 |
| 3,729,957 A * | 5/1973 | Petrie et al. | 60/268 |
| 3,861,139 A * | 1/1975 | Jones | 60/268 |
| 4,790,133 A | 12/1988 | Stuart | |
| 4,969,325 A | 11/1990 | Adamson et al. | |
| 5,010,729 A * | 4/1991 | Adamson et al. | 60/268 |
| 5,274,999 A | 1/1994 | Rohra et al. | |
| 6,205,771 B1 * | 3/2001 | Rowe | 60/226.1 |
| 6,339,927 B1 | 1/2002 | DiPietro et al. | |
| 6,381,948 B1 | 5/2002 | Klingels | |
| 6,619,030 B1 | 9/2003 | Seda et al. | |
| 6,666,017 B2 | 12/2003 | Prentice et al. | |
| 6,739,120 B2 | 5/2004 | Moniz et al. | |
| 6,827,548 B2 | 12/2004 | Coxhead et al. | |
| 6,883,303 B1 | 4/2005 | Seda | |
| 2001/0020361 A1 * | 9/2001 | Udall et al. | 60/226.1 |
| 2003/0200741 A1 | 10/2003 | Moniz et al. | |
| 2003/0217546 A1 | 11/2003 | Prentice et al. | |
| 2006/0059887 A1 * | 3/2006 | Klingels et al. | 60/226.1 |
| 2007/0084188 A1 | 4/2007 | Orlando et al. | |

FOREIGN PATENT DOCUMENTS

| | | |
|---|---|---|
| DE | 3933776 A1 | 4/1991 |
| EP | 1653064 A2 | 10/2005 |
| EP | 1 777 370 A2 | 4/2007 |

OTHER PUBLICATIONS

GB Search Report, Application No. GB0721191.5 (Feb. 25, 2008).
Intellectual Property Office, Examination Report for Application No. GB0721191.5, Jul. 30, 2010, 5 pages.

* cited by examiner

*Primary Examiner* — Ted Kim
(74) *Attorney, Agent, or Firm* — William Scott Andes, Esq.; Armstrong Teasdale LLP

(57) ABSTRACT

A turbofan engine assembly includes a core gas turbine engine including a high-pressure compressor, a combustor, and a high-pressure turbine, a booster compressor coupled upstream from the core gas turbine engine, an intermediate-pressure turbine coupled to the booster compressor, the intermediate-pressure turbine disposed downstream from the core gas turbine engine, a first fan assembly coupled to a low-pressure turbine, a second fan assembly disposed downstream from the first fan assembly, and a gearbox coupled between the second fan assembly and the low-pressure turbine. A method of assembling the above turbofan engine assembly is also described herein.

20 Claims, 4 Drawing Sheets

TURBOFAN ENGINE ASSEMBLY AND METHOD OF ASSEMBLING SAME

BACKGROUND OF THE INVENTION

This invention relates generally to turbofan engines, and more specifically to a turbofan engine assembly that includes a booster compressor driven by an intermediate-pressure turbine.

To facilitate increasing engine efficiency, at least one known turbofan engine assembly includes a counter-rotating low-pressure turbine that is coupled to a counter-rotating fan assembly. More specifically, to assemble a turbofan engine assembly that includes a counter-rotating low-pressure turbine, an outer rotating spool, a rotating frame, a mid-turbine frame, and two concentric shafts, are installed within the turbofan engine assembly to facilitate supporting the counter-rotating low-pressure turbine. However, while the use of a counter-rotating low-pressure turbine increases the overall engine efficiency, the overall weight, design complexity, and/or manufacturing costs of such an engine are increased.

BRIEF DESCRIPTION OF THE INVENTION

In one aspect, a method of assembling a turbofan engine assembly is provided. The method includes providing a core gas turbine engine including a high-pressure compressor, a combustor, and a high-pressure turbine, coupling a booster compressor upstream from the core gas turbine engine, coupling an intermediate-pressure turbine downstream from the core gas turbine engine, coupling the booster compressor to the intermediate-pressure turbine using a first shaft, coupling a first fan assembly to a low-pressure turbine, and coupling a second fan assembly to the low-pressure turbine using a gearbox.

In another aspect, a turbofan engine assembly is provided. The turbofan engine assembly includes a core gas turbine engine including a high-pressure compressor, a combustor, and a high-pressure turbine, a booster compressor coupled upstream from the core gas turbine engine, an intermediate-pressure turbine coupled to the booster compressor, the intermediate-pressure turbine disposed downstream from the core gas turbine engine, a first fan assembly coupled to a low-pressure turbine, a second fan assembly disposed downstream from the first fan assembly, and a gearbox coupled between the second fan assembly and the low-pressure turbine. A method of assembling the above turbofan engine assembly is also described herein.

DETAILED DESCRIPTION OF THE INVENTION

Figure 1:
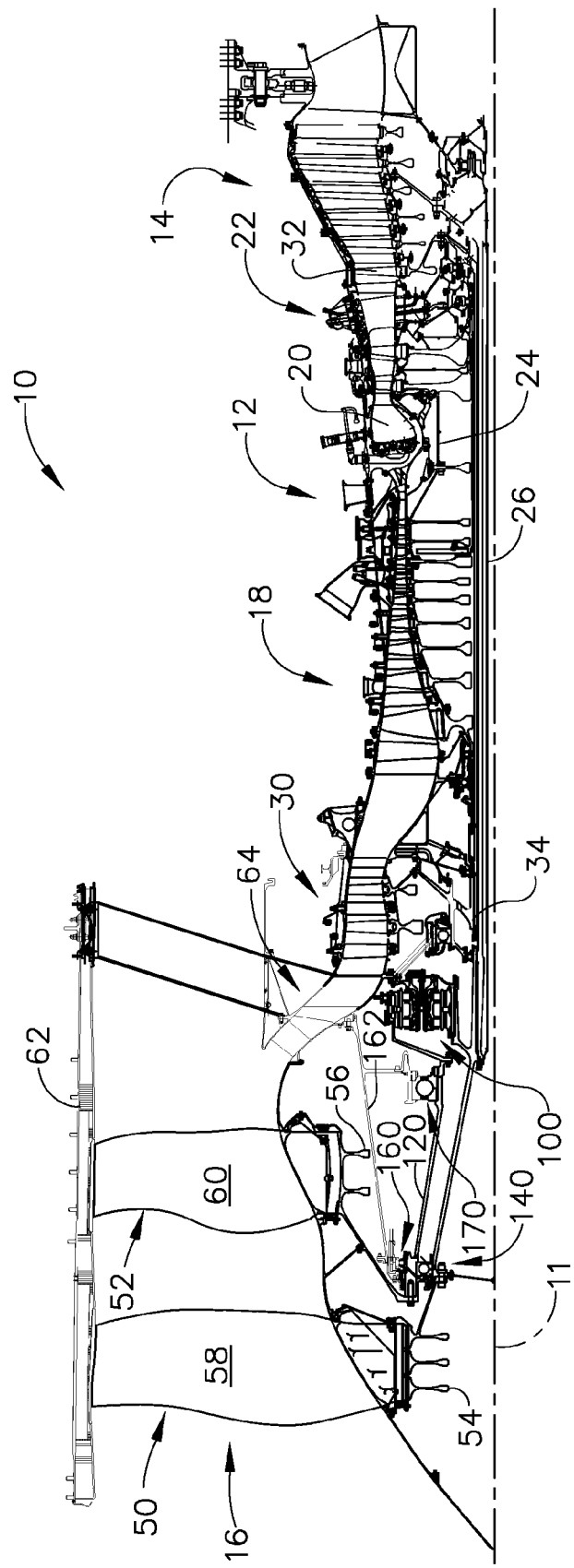
FIG. 1 is a cross-sectional view of a turbofan engine assembly.

FIG. 1 is a cross-sectional view of a portion of an exemplary turbofan engine assembly 10 having a longitudinal axis 11. In the exemplary embodiment, turbofan engine assembly 10 includes a core gas turbine engine 12, a low-pressure turbine 14 disposed axially downstream from core gas turbine engine 12 and a counter-rotating fan assembly 16 that is disposed axially upstream from core gas turbine engine 12. Core gas turbine engine 12 includes a high-pressure compressor 18, a combustor 20, and a high-pressure turbine 22 that is coupled to high-pressure compressor 18 via a shaft 24. In the exemplary embodiment, high-pressure turbine 22 includes two turbine stages. Optionally, high-pressure turbine 22 may include a single stage or have a stage count greater than two.

Figure 3:
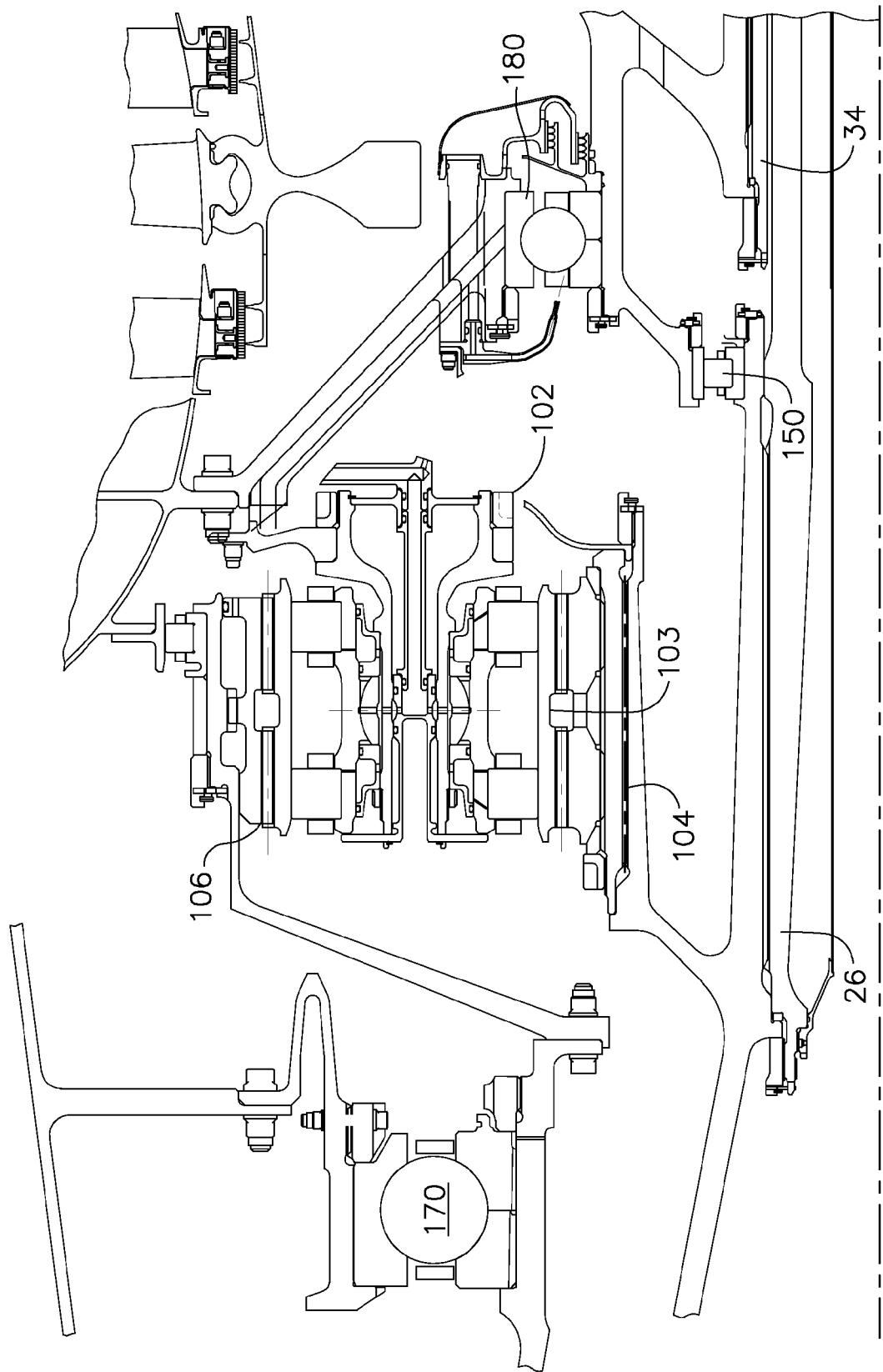
FIG. 3 is an enlarged cross-sectional view of the upstream portion of the turbofan engine assembly shown in FIG. 1.

In the exemplary embodiment, counter-rotating fan assembly 16 includes a first or forward fan assembly 50 and a second or an aft fan assembly 52 that is disposed downstream from forward fan assembly 50. The terms "forward fan" and "aft fan" are used herein to indicate that first fan assembly 50 is coupled axially upstream from second fan assembly 52. In the exemplary embodiment, fan assemblies 50 and 52 are each disposed upstream from core gas turbine engine 12, as shown in FIGS. 1 and 3. Fan assemblies 50 and 52 each include a respective rotor disk 54 and 56, and a plurality of rotor blades 58 and 60 that are coupled to each respective rotor disk. Counter-rotating fan assembly 16 is positioned within a fan nacelle 62.

In one embodiment, turbofan engine assembly 10 also includes a gooseneck 64 that extends between and facilitates coupling fan assembly 16 to core gas turbine engine 12. Moreover, gooseneck 64 includes a structural strut and/or aero strut to facilitate channeling air discharged from second fan assembly 52, through gooseneck 64, to a booster compressor 30. As such, the configuration of gooseneck 64 and the structural strut facilitate substantially reducing and/or eliminating ice and/or foreign particle ingestion into booster compressor 30 and thus core gas turbine engine 12 since gooseneck 64 substantially "hides" the booster compressor inlet from the main air flowstream that is channeled axially past the exterior surface of gooseneck 64 in an downstream direction.

In the exemplary embodiment, turbofan engine assembly 10 is a three-spool engine wherein the first spool includes high-pressure compressor 18 that is coupled to high-pressure turbine 22 via shaft 24. The second spool includes low-pressure turbine 14 which is coupled to counter-rotating fan assembly 16 utilizing a combination of a gearbox 100 and a shaft 26. The second spool will be discussed in more detail below. Turbofan engine assembly 10 also includes a third spool that includes multi-stage booster compressor 30 that is coupled directly to an intermediate-pressure turbine 32 via a shaft 34. As shown in FIG. 1, booster compressor 30 is disposed axially downstream from fan assembly 16 and axially upstream from core gas turbine engine 12. Moreover, intermediate-pressure turbine 32 is disposed downstream from high-pressure turbine 22 and axially upstream from low-pressure turbine 14.

Figure 2:
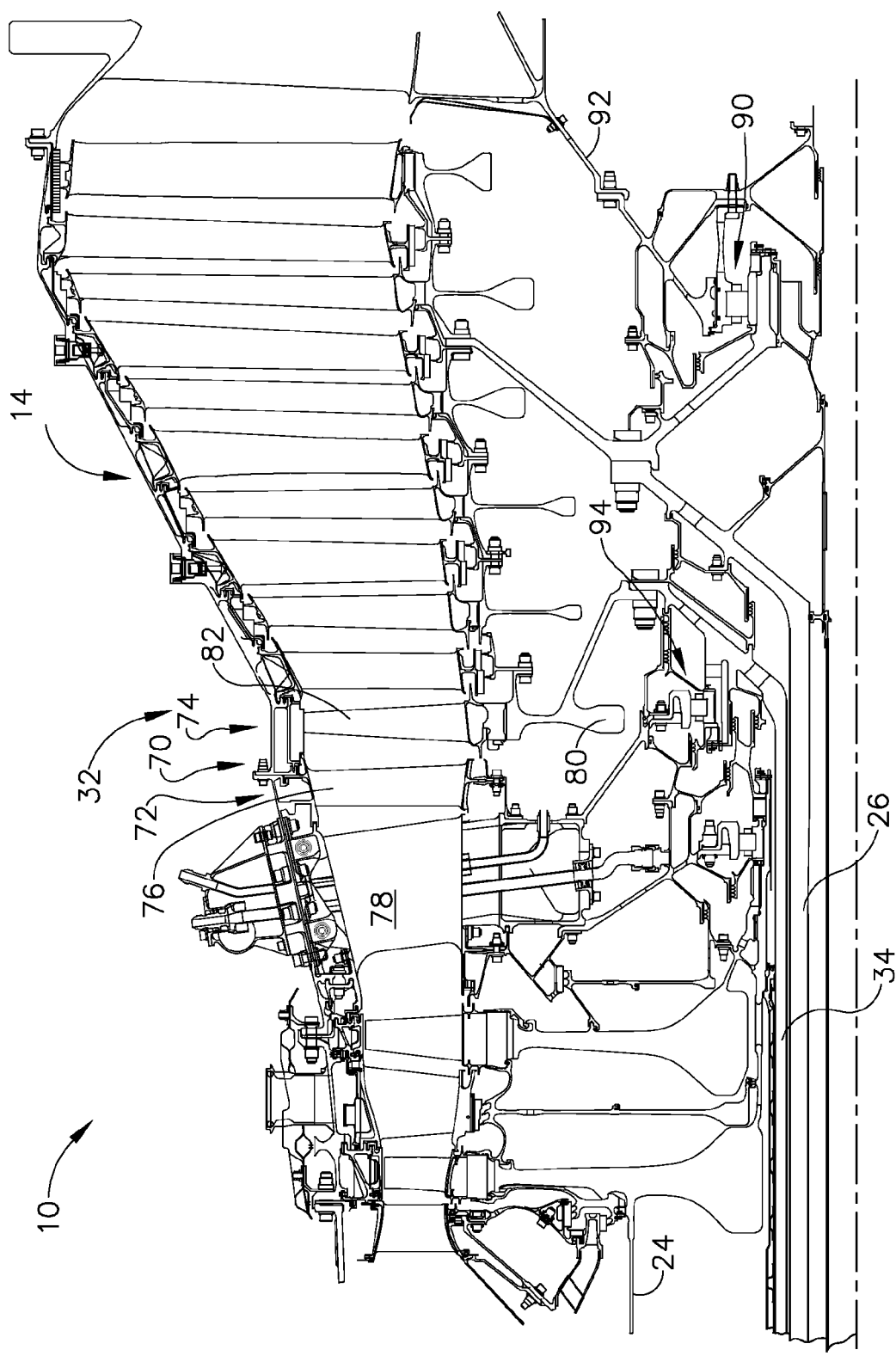
FIG. 2 is an enlarged cross-sectional view of the downstream portion of the turbofan engine assembly shown in FIG. 1.

FIG. 2 illustrates an enlarged cross-sectional view of the downstream portion of turbofan engine assembly 10 shown in FIG. 1. In the exemplary embodiment, intermediate-pressure turbine 32 includes a single stage 70 that includes a stator vane section 72 and a rotor section 74 that is downstream from stator vane section 72. Stator vane section 72 includes a plurality of stationary stator vanes 76 that are coupled to a turbine mid-frame 78. Rotor section 74 includes a disk 80 and a plurality of blades 82 that are coupled to disk 80. As shown in FIG. 2, disk 80 is coupled to shaft 34 and thus to booster compressor 30, shown in FIG. 1. As shown in FIG. 2, shaft 34 is disposed radially outwardly from shaft 26, and shaft 24 is disposed radially outwardly from shaft 34. Although the exemplary embodiment, describes intermediate-pressure turbine 32 as including a single stage 70, it should be realized that intermediate-pressure turbine 32 may include a plurality of stages.

Turbofan engine assembly 10 also includes a bearing assembly 90 that is utilized to provide radial support for low-pressure turbine 14. In the exemplary embodiment, bearing assembly 90 is a roller bearing that is disposed between low-pressure turbine 14 and a turbine rear-frame 92 to provide radial support to low-pressure turbine 14. Moreover, a roller bearing assembly 94 is disposed between intermediate-pressure turbine 32 and turbine mid-frame 78 to provide radial support for intermediate-pressure turbine 32.

FIG. 3 illustrates an enlarged cross-sectional view of the upstream portion of turbofan engine assembly 10 shown in FIG. 1. In use, gearbox 100 is utilized to drive second fan assembly 52 is a rotational direction that is opposite to the rotational direction of first fan assembly 50. In the exemplary embodiment, gearbox 100 is a planetary gearbox that has a generally toroidal shape to allow gearbox 100 to be positioned circumferentially around drive shaft 26. As shown in FIG. 3, gearbox 100 includes a housing 102, at least one gear 103 that is coupled within housing 102, an input 104 that is coupled to shaft 26, and an output that is used to drive second or aft fan assembly 52.

More specifically, turbofan engine assembly 10 includes a shaft 110 that is coupled between first fan assembly 50 and splined to shaft 26 such that the first fan assembly 50 is directly driven by low-pressure turbine 14 at the same speed and in the same rotational direction as low-pressure turbine 14. Turbofan engine assembly 10 also includes a shaft 120 that is coupled between second fan assembly 52 and gearbox output 106, and a torque cone 130 that is coupled between booster compressor 30 and shaft 34 such that booster compressor 30 is driven by intermediate-pressure turbine 32, shown in FIGS. 1 and 2.

In one embodiment, gearbox 100 has a gear ratio of approximately 2.0 to 1 such that forward fan assembly 50 rotates at a rotational speed that is approximately twice the rotational speed of aft fan assembly 52. In another embodiment, gearbox 100 has a gear ratio that allows first fan assembly 50 to rotate with a rotational speed that is between approximately 0.67 and approximately 2.1 times faster than the rotational speed of second fan assembly 52.

In the exemplary embodiment, turbofan engine assembly 10 includes, a first bearing assembly, such as thrust bearing assembly 140, that is disposed at an upstream end between shaft 110 and shaft 120. Thrust bearing assembly 140 is utilized to substantially balance the thrust loads generated by first fan assembly 50, second fan assembly 52, and low-pressure turbine 14, shown in FIGS. 1 and 2, and transmit any residual thrust through thrust bearing 170 to a stationary support structure, such as fan frame 15.

Turbofan engine assembly 10 also includes a roller bearing assembly 150 that is disposed at a downstream end between shaft 110 and shaft 34. Roller bearing assembly 150 acts as a differential bearing assembly in combination with thrust bearing assembly 140 to provide radial support for first fan assembly 50. A roller bearing assembly 160 is disposed between an upstream end of shaft 120 and a structural member 162 that is coupled to fan frame 15. Roller bearing 160 provides radial support for second fan assembly 52.

Turbofan engine assembly 10 also includes a thrust bearing assembly 170 that is disposed at a downstream end of shaft 120, between shaft 120 and structural member 162. Thrust bearing assembly 170 is utilized to absorb the thrust loads generated by second fan assembly 52 and transmit the residual thrust loads from first fan assembly 50, second fan assembly 52, and low-pressure turbine 14, to fan frame 15 via structural member 162.

Turbofan engine assembly 10 also includes a thrust bearing assembly 180 that is disposed between shaft 34 and fan frame 15. Thrust bearing assembly 180 is utilized to substantially balance the thrust loads generated by booster compressor 30 and intermediate-pressure turbine 32, shown in FIGS. 1 and 2, and transmit any residual thrust to a stationary support structure, such as fan frame 15.

During operation, core gas turbine engine 12 produces an exhaust gas stream that is utilized to drive both intermediate-pressure turbine 32 and thus booster compressor 30 via shaft 34. Moreover, the core engine exhaust gas stream is also utilized to drive low-pressure turbine 14, and thus the counter-rotating fan assembly 16 via shaft 26 and gearbox 100. During operation, gearbox 100 is continuously lubricated.

Figure 4:
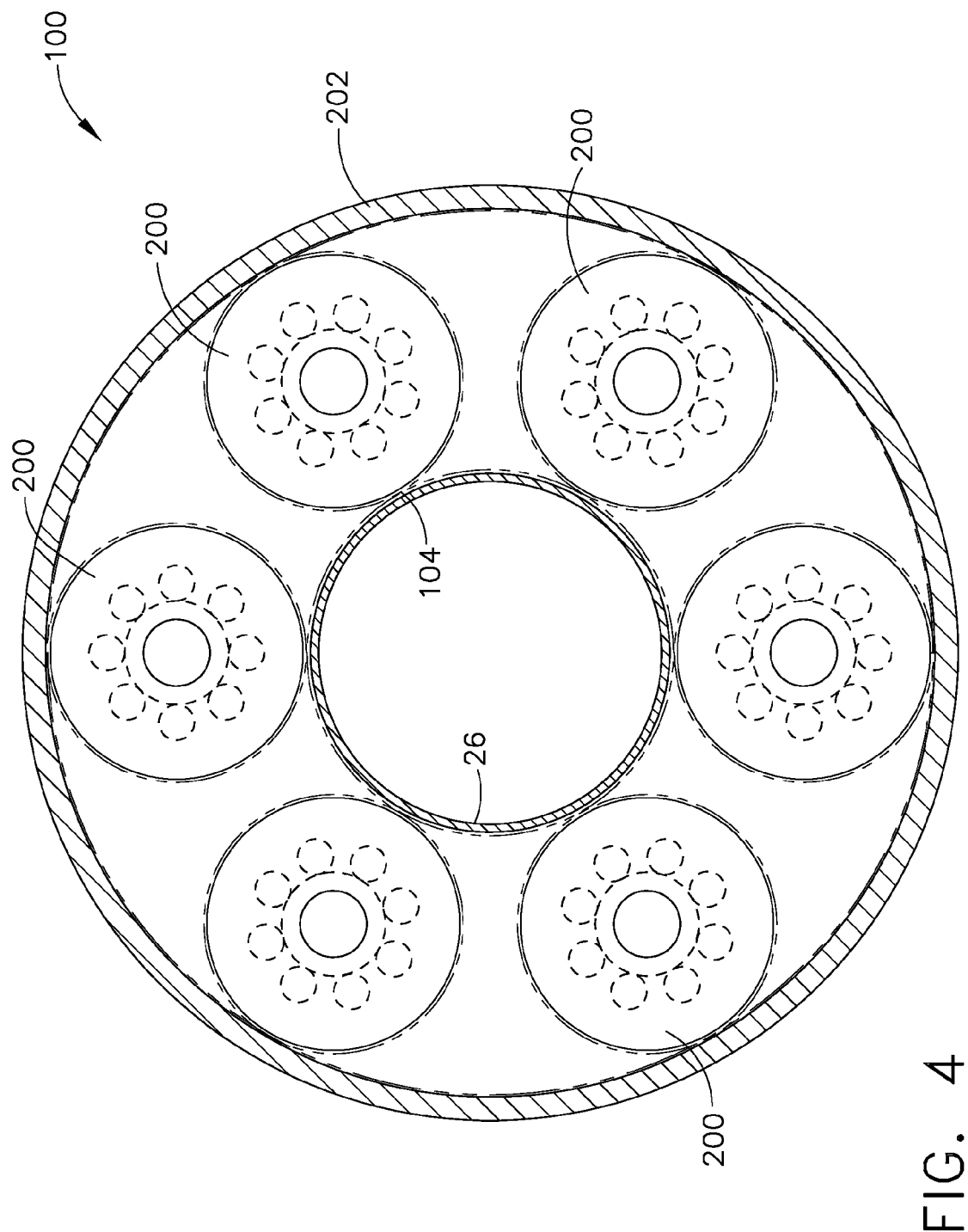
FIG. 4 is an end view of the gearbox shown in FIGS. 1, 2, and 3.

FIG. 4 is an end view of gearbox 100 illustrated in FIGS. 1, 2, and 3. As shown in FIG. 4, gearbox 100 including a plurality of planet gears 200 that are retained within a gear housing 202. Gearbox input 104 is coupled to shaft 26 such that the low-pressure turbine 14 drives planet gears 200. Moreover, the first gearbox output 106 is coupled to second fan assembly 52 via shaft 120. As such, low-pressure turbine 14 drives gearbox 100 and thus drives the second fan assembly 52 at a first rotational speed in a first rotational direction, and drives the second fan assembly 52 at a second different rotational speed in a second or opposite rotational direction to first fan assembly 50.

During assembly, a core gas turbine engine including a high-pressure compressor, a combustor, and a high-pressure turbine is provided. A booster compressor is coupled upstream from the core gas turbine engine, an intermediate-pressure turbine is coupled downstream from the core gas turbine engine, a counter-rotating fan assembly is coupled upstream from the booster compressor, the counter-rotating fan assembly including a first fan configured to rotate in a first direction and a second fan configured to rotate in an opposite second direction. The first fan assembly is coupled directly to/and driven by the low-pressure turbine, and the second fan is coupled to a gearbox which is driven by the low-pressure turbine.

The turbofan engine assembly described herein is a three-spool turbofan engine assembly that includes an intermediate-pressure turbine that is coupled directly to a booster compressor. The assembly described herein reduces at least some of the complexities associated with known counter-rotating low-pressure turbines. More specifically, the turbofan engine assembly described herein includes a counter-rotating fan that is coupled to a single-rotating low-pressure turbine. Specifically, the forward or first fan assembly is coupled directly to the low-pressure turbine, whereas the second fan assembly is coupled to a gearbox which is driven by the low-pressure turbine. In the exemplary embodiment, the forward fan rotates at a rotational speed that is approximately twice the rotational speed of the downstream fan to achieve peak efficiency.

The booster is driven by a single stage intermediate-pressure turbine at a rotational speed that is between the rotational speed of the low-pressure turbine and the high-pressure compressor. More specifically, the intermediate-pressure turbine rotates at a rotational speed that is less than the rotational speed of the high-pressure compressor and greater than the rotational speed of the low-pressure turbine to increase the overall engine pressure ratio, improve performance, and reduce the number of stages in the booster.

The benefits of utilizing a counter-rotating fan are increased fan efficiency, reduced fan tip speed, lower noise or smaller fan diameter than comparable single fan engine and elimination of the bypass outlet guide vanes. The elimination of the counter-rotating low-pressure turbine also results in the elimination of the outer rotating spool, rotating rear frame, second low-pressure turbine shaft, and the outer rotating seal located between the outer rotating spool and the outer stationary casing.

The turbofan engine assembly described herein improves the previous concepts in that a high-speed booster is directly driven by a single stage intermediate-pressure turbine. This concept will allow better pressure rise matching between the fan hub, booster and the high-pressure compressor. During operation, the turbofan engine assembly described herein is estimated to be substantially lighter than the current counter-rotating fan engines being studied. The result is about a 1.6% improvement in fuel burn when compared to a comparable single-rotation engine at constant noise. A performance benefit of about 1.6% in SFC could be obtained if the counter-rotating engine is designed to a similar fan diameter as a comparable single-rotation engine. This turbofan engine assembly has the potential to more readily meet the low noise requirements, improved fuel burn, and need for more electric designs being demanded by the airline industry. This configuration contains all the major changes from a conventional engine in the front of the geared engine for easy access.

While the invention has been described in terms of various specific embodiments, those skilled in the art will recognize that the invention can be practiced with modification within the spirit and scope of the claims.

What is claimed is:

1. A method of assembling a turbofan engine assembly, said method comprising:
   coupling a booster compressor to an upstream end of a core gas turbine engine;
   coupling an intermediate-pressure turbine downstream from the core gas turbine engine;
   directly coupling the booster compressor to the intermediate-pressure turbine using a first shaft;
   directly coupling a first fan assembly to a low-pressure turbine; and
   coupling a second fan assembly positioned downstream of the first fan assembly to the low-pressure turbine using a gearbox, wherein the first fan assembly and the second fan assembly each extend to a nacelle surrounding the first and second fan assembly.

2. A method in accordance with claim 1, further comprising coupling the low-pressure turbine downstream from the intermediate-pressure turbine.

3. A method in accordance with claim 1, further comprising coupling the second fan assembly to the low-pressure turbine such that the second fan assembly rotates in a rotational direction that is opposite to the rotational direction of the first fan assembly.

4. A method in accordance with claim 1, wherein the gearbox includes an input and an output, said method further comprising coupling the gearbox input to the low-pressure turbine using a second shaft and coupling the gearbox output to the second fan assembly using a third shaft.

5. A method in accordance with claim 1, further comprising coupling a planetary gearbox between the low-pressure turbine and the second fan assembly.

6. A method in accordance with claim 1, further comprising coupling a gooseneck between the second fan assembly and the booster compressor to channel air discharged from the second fan assembly to the booster compressor.

7. A method in accordance with claim 1, further comprising providing a core gas turbine engine that includes a single stage high-pressure turbine.

8. A method in accordance with claim 1, further comprising coupling a single-stage intermediate-pressure turbine downstream from the core gas turbine engine.

9. A method in accordance with claim 1, further comprising coupling a thrust bearing between the first fan assembly and the low-pressure turbine to substantially balance the thrust loads generated by the first fan assembly and the low-pressure turbine.

10. A method in accordance with claim 1, further comprising coupling a thrust bearing between the booster compressor and a fan frame to transmit thrust loads generated by the booster compressor and the intermediate-pressure turbine to the fan frame.

11. A turbofan engine assembly comprising;
   a booster compressor coupled to an upstream end of a core gas turbine engine;
   an intermediate-pressure turbine directly coupled to said booster compressor, said intermediate-pressure turbine disposed downstream from said core gas turbine engine;
   a first fan assembly directly coupled to a low-pressure turbine;
   a second fan assembly disposed downstream from said first fan assembly, wherein said first fan assembly and said second fan assembly each extend to a nacelle surrounding said first and second fan assembly; and
   a gearbox coupled between said second fan assembly and said low-pressure turbine.

12. A turbofan engine assembly in accordance with claim 11, wherein said low-pressure turbine is coupled downstream from said intermediate-pressure turbine.

13. A turbofan engine assembly in accordance with claim 11, wherein said second fan assembly is coupled to said low-pressure turbine such that said second fan assembly rotates in a rotational direction that is opposite to the rotational direction of said first fan assembly.

14. A turbofan engine assembly in accordance with claim 11, wherein said gearbox comprises an input and an output, said input coupled to said low-pressure turbine using a first shaft and said output coupled to said second fan assembly using a third shaft.

15. A turbofan engine assembly in accordance with claim 11, wherein said gearbox comprises a planetary gearbox coupled between said low-pressure turbine and said counter-rotating fan assembly.

16. A turbofan engine assembly in accordance with claim 11, further comprising a gooseneck coupled between said second fan assembly and said booster compressor to channel air discharged from said second fan assembly to said booster compressor.

17. A turbofan engine assembly in accordance with claim 11, wherein said high-pressure turbine comprises a multi-stage high-pressure turbine and said low-pressure turbine comprises a multi-stage low-pressure turbine.

18. A turbofan engine assembly in accordance with claim 11, wherein said intermediate-pressure turbine comprises a multi-stage intermediate-pressure turbine.

19. A turbofan engine assembly in accordance with claim 11, further comprising a thrust bearing coupled between said first fan assembly and said low-pressure turbine to substantially balance the thrust loads generated by said first fan assembly and said low-pressure turbine.

20. A turbofan engine assembly in accordance with claim 11, further comprising a thrust bearing coupled between said booster compressor and a fan frame to transmit the thrust loads generated by said booster compressor and said intermediate-pressure turbine to said fan frame.

* * * * *